July 15, 1924.
P. V. HUNTER
1,501,115
PROTECTIVE ARRANGEMENT FOR ELECTRIC DISTRIBUTION AND TRANSMISSION SYSTEMS
Filed Jan. 20, 1921
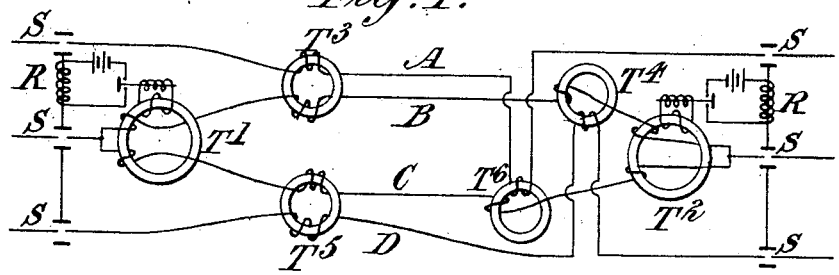
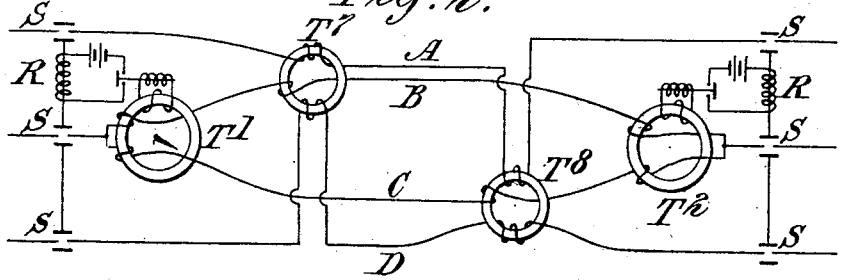
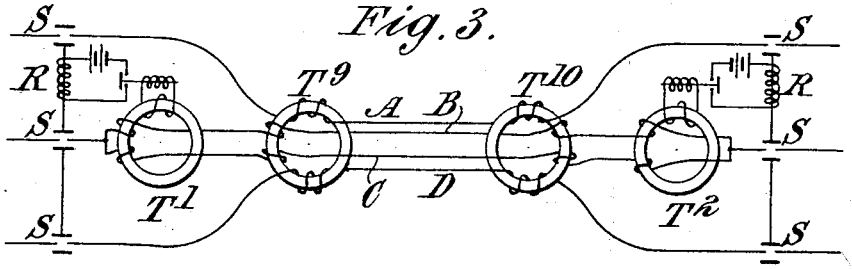
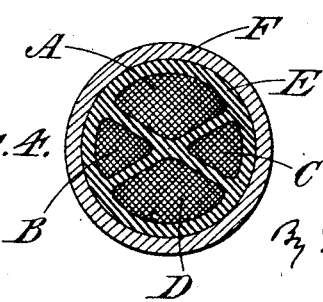

Patented July 15, 1924.

1,501,115

UNITED STATES PATENT OFFICE.

PHILIP VASSAR HUNTER, OF PURLEY, ENGLAND.

PROTECTIVE ARRANGEMENT FOR ELECTRIC DISTRIBUTION AND TRANSMISSION SYSTEMS.

Application filed January 20, 1921. Serial No. 438,728.

*To all whom it may concern:*

Be it known that I, PHILIP VASSAR HUNTER, subject of the King of England, and residing at Purley, Surrey, in England, have invented certain new and useful Improvements in Protective Arrangements for Electric Distribution and Transmission Systems, of which the following is a specification.

This invention relates to protective arrangements for electric distribution and transmission systems and has particular reference to the protection of three-phase systems wherein four conductors are employed two of them forming the split conductors of one phase.

It has been proposed to make up a cable with four such conductors in the form of separate cores and the primary object of the present invention is the provision of a simple and effective protective arrangement for use in conjunction with such cables. The improved protective system may however be applied to a three-phase system having four conductors two of which form the split conductors in one phase whether these conductors are made up in the form of a single cable or not.

In the following description the two conductors in one phase are referred to as the "split" conductors, and the two remaining conductors are called the "unsplit" conductors.

According to this invention the split conductors are connected at each end of the section to be protected through opposed primary windings of a transformer whose secondary winding operates a relay controlling the switches or circuit breakers in all three phases. Balancing transformers are also provided having windings in circuit with the split conductors and with the other unsplit conductors the whole arrangement being such that the switches or circuit breakers are operated when a fault of any kind occurs in a phase between phases or from any conductor to earth.

The details of the improved protective arrangement may vary and in the accompanying drawings—

Figure 1 represents one arrangement using four balancing transformers,

Figures 2 and 3 show alternative arrangements each using two balancing transformers, and Figure 4 shows a cross-section of a convenient form of three-phase four-conductor cable.

In all the figures B and C are the split conductors and A and D the unsplit conductors. At each end of the split conductors B and C are transformers $T^1$ and $T^2$ through the two opposed primary windings of each of which the split conductors B and C are joined. The secondaries of these transformers energize relays R R controlling switches or circuit breakers S in all three phases.

Figure 1 shows an arrangement in which four balancing transformers $T^3$ $T^4$ $T^5$ $T^6$ are employed each having two windings one in series with one of the split conductors and the other in series with one of the unsplit conductors. Thus $T^3$ is connected in series with A and B; $T^4$ with B and D; $T^5$ with C and D and $T^6$ with A and C. Thus there are two transformers having windings in series with each unsplit conductor, for instance $T^3$ and $T^6$ with A, and these are placed one at each end of the section to be protected.

In the arrangement shown in Figure 2 two balancing transformers $T^7$ and $T^8$ are employed each provided with three windings. One of these transformers $T^7$ is at one end of the section and has one winding in series with the split conductor B and the second and third windings in series respectively with the unsplit conductors A and D. The other transformer $T^8$ is placed at the other end of the section and has its windings in series with C A and D respectively. The second and third windings of each balancing transformer are preferably wound in opposite directions or connected in opposition to each other.

Figure 3 shows another alternative method of carrying out this invention in which two balancing transformers $T^9$ and $T^{10}$ are employed each having four windings. The windings are connected in series respectively with each of the unsplit conductors A and D and with each of the two split conductors B and C which constitute the third phase. The windings in series with A and D are opposed to one another as also are the windings in series with B and C.

Figure 4 illustrates a convenient known form of three-phase four-conductor cable, to which the present invention is readily applicable. The cores B and C of the cable are the split conductors in one phase and the cores A and D the unsplit conductors. For economy in construction these cores are made sector-shaped, but it must be remembered that, as is usual in such cables, each core is made up of a large number of conducting strands in metallic contact with one another so as to form a continuous sector-shaped conductor. The four cores are separated from one another and also surrounded by a layer of insulation E. Outside this insulating layer there is preferably arranged a lead sheath F to prevent damage to the cable in the usual manner. The protective system is applied to the cores A B C D of such a cable in the manner described with reference to Figures 1, 2 and 3.

Although it has been stated in some cases that windings of balancing transformers are preferably opposed to each other it should be remembered in connection with each method that normally the currents carried by these windings are out of phase with each other. There is therefore a flux in the core of the transformer and the effects in any one transformer are not balanced. In normal conditions however there is a balance between the effects of the two transformer windings at the two ends of the protected section.

In all cases the arrangement is such that a fault from any one of the four conductors A B C D to earth or to another conductor or a fault of the nature of an open circuit in the split conductors will disturb the balance of the protective arrangement and cause the operation of the relays and the consequent cutting out of all three phases of the four conductor system. For instance in the arrangement shown in Figure 1:—

For a fault from the conductor A to earth the transformers T³ and T⁶ will disturb the balance in B and C and cause the operation of the relay.

Similarly also for a fault from D to earth.

For a fault from B or C to earth the transformers T' and T² and therefore also the relays are directly operated.

For a fault from A to B it would appear at first sight that the fault currents flowing through the windings of the transformer T³ would neutralize each other and there would be no action but the fault current flowing in B would also pass through the winding of the transformer T' and the balance in this transformer would be upset thus operating the relays.

A similar action takes place for faults between A and C or D and B or D and C.

A fault between A and D produces unbalancing in the current in B and C just as if A and D had both developed faults to earth.

In the case of a fault between B and C the balance of currents in B and C is upset through the action of the balancing transformers and the currents in A and D.

The arrangements shown in Figures 2 and 3 can similarly be shown to render protection when any of these faults may develop.

When the invention is applied to a system where the four conductors are not made up into a cable say for instance an overhead line system the two split conductors would be arranged symmetrically with regard to the unsplit conductors or would be crossed at intervals throughout the length of the line.

What I claim as my invention and desire to secure by Letters Patent is:—

1. A protective arrangement for a three phase four-conductor electric distribution or transmission system wherein two of the four conductors constitute the split conductors in one phase, comprising two transformers one at each end of the split conductors, which are connected through the opposed primary windings of the transformers, relays operated by the secondary windings thereof, circuit breakers in all three phases controlled by the relays, and balancing transformers having at least two windings, one of which is in circuit with one split conductor and one with one unsplit conductor, so that the circuit breakers are operated on the occurrence of a fault in the system.

2. The combination with a four-conductor cable for three-phase electric distribution or transmission, wherein two of the four conductors constitute the split conductors in one phase, of two transformers one at each end of the split conductors, which are connected through the opposed primary windings of the transformers, relays operated by the secondary windings thereof, circuit breakers in all three phases controlled by the relays, and balancing transformers having at least two windings, one of which is in circuit with one split conductor and one with one unsplit conductor, so that the circuit breakers are operated on the occurrence of a fault in the system.

3. A protective arrangement for a three-phase four-conductor electric distribution or transmission system wherein two of the four conductors constitute the split conductors in one phase, comprising two transformers one at each end of the split conductors, which are connected through the opposed primary windings of the transformers, relays operated by the secondary windings thereof, circuit breakers in all three phases controlled by the relays, and two balancing transformers one at each end of the split conductors, two of the windings of each balancing transformer being opposed and in circuit respectively with the unsplit conductors, the whole arrangement being such that the circuit breakers are operated on the occurrence of a fault in the system.

4. A protective arrangement for a three-phase four-conductor electric distribution or transmission system wherein two of the four conductors constitute the split conductors in one phase, comprising two transformers one at each end of the split conductors, which are connected through the opposed primary windings of the transformers, relays operated by the secondary windings thereof, circuit breakers in all three phases controlled by the relays, and two balancing transformers one at each end of the split conductors each of said balancing transformers having four windings, two of the windings of each balancing transformer being opposed and in circuit respectively with the unsplit conductors, and the other two windings of each balancing transformer being opposed and in circuit respectively with the split conductors.

5. The combination with a four-conductor cable for three-phase electric distribution or transmission, wherein two of the four conductors constitute the split conductors in one phase, of two transformers one at each end of the split conductors, which are connected through the opposed primary windings of the transformers, relays operated by the secondary windings thereof, circuit breakers in all three phases controlled by the relays, and two balancing transformers one at each end of the split conductors, two of the windings of each balancing transformer being opposed and in circuit respectively with the unsplit conductors, the whole arrangement being such that the circuit breakers are operated on the occurrence of a fault in the system.

6. The combination with a four conductor cable for three-phase electric distribution or transmission, wherein two of the four conductors constitute the split conductors in one phase, of two transformers one at each end of the split conductors, which are connected through the opposed primary windings of the transformers, relays operated by the secondary windings thereof, circuit breakers in all three phases controlled by the relays, and two balancing transformers one at each end of the split conductors, two of the windings of each balancing transformer being opposed and in circuit respectively with the unsplit conductors, and the other two windings of each balancing transformer being opposed and in circuit respectively with the split conductors.

In testimony whereof I have signed my name to this specification.

PHILIP VASSAR HUNTER.